(12) United States Patent
Duque Biarge et al.

(10) Patent No.: US 11,150,342 B2
(45) Date of Patent: Oct. 19, 2021

(54) VEHICLE RADAR SENSING SYSTEM WITH SURFACE SEGMENTATION USING INTERFEROMETRIC STATISTICAL ANALYSIS

(71) Applicant: Magna Electronics Inc., Auburn Hills, MI (US)

(72) Inventors: Sergio Duque Biarge, Munich (DE); Holger Hess, Aschaffenburg (DE); Jorge J. Jácome Muñoz, Aschaffenburg (DE); Kalin Kabakchiev, Frankfurt am Main (DE); Roaldje Nadjiasngar, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 346 days.

(21) Appl. No.: 16/123,276

(22) Filed: Sep. 6, 2018

(65) Prior Publication Data

US 2019/0072669 A1 Mar. 7, 2019

Related U.S. Application Data

(60) Provisional application No. 62/555,223, filed on Sep. 7, 2017.

(51) Int. Cl.
*G01S 13/931* (2020.01)
*G01S 13/44* (2006.01)
(Continued)

(52) U.S. Cl.
CPC ........ *G01S 13/931* (2013.01); *G01S 13/4454* (2013.01); *G06T 7/11* (2017.01);
(Continued)

(58) Field of Classification Search
CPC ............... G01S 13/4454; G01S 13/931; G01S 2013/9314; G01S 2013/9315;
(Continued)

(56) References Cited

U.S. PATENT DOCUMENTS 4,943,796 A 7/1990 Lee
5,550,677 A 8/1996 Schofield et al.
(Continued)

FOREIGN PATENT DOCUMENTS

EP 1506893 A2 2/2005
WO 2011090484 A1 7/2011
WO 2018007995 A1 1/2018

OTHER PUBLICATIONS

Rapp et al. "Probabilistic ego-motion estimation using multiple automotive radar sensors." Robotics and Autonomous Systems 89, 136-146, 2017.
(Continued)

*Primary Examiner* — Timothy X Pham
(74) *Attorney, Agent, or Firm* — Honigman LLP

(57) ABSTRACT

A sensing system for a vehicle includes at least one radar sensor disposed at the vehicle and having a field of sensing exterior of the vehicle. The at least one radar sensor includes multiple transmitting antennas and multiple receiving antennas. The transmitting antennas transmit signals and the receiving antennas receive the signals reflected off objects. Radar data sensed by the at least one radar sensor is received at a control, and a vehicle motion estimation is received at the control and processed at a processor of the control. The control, responsive at least in part to processing at the processor of the received sensed radar data and the received vehicle motion estimation, determines different types of surfaces in the field of sensing of the at least one radar sensor.

22 Claims, 1 Drawing Sheet

(51) Int. Cl.
*G06T 7/41* (2017.01)
*G06T 7/11* (2017.01)
*G06K 9/00* (2006.01)

(52) U.S. Cl.
CPC .......... *G06T 7/41* (2017.01); *G01S 2013/932* (2020.01); *G01S 2013/9314* (2013.01); *G01S 2013/9315* (2020.01); *G01S 2013/9317* (2013.01); *G06K 9/00791* (2013.01); *G06T 2207/10044* (2013.01); *G06T 2207/30252* (2013.01)

(58) Field of Classification Search
CPC ....... G01S 2013/9317; G01S 2013/932; G01S 2013/9332; G01S 2013/9353; G06T 2207/10044; G06T 2207/30252; G06T 7/11; G06T 7/41; G06K 9/00791
See application file for complete search history.

(56) References Cited

U.S. PATENT DOCUMENTS

| | | | |
|---|---|---|---|
| 5,585,798 A | 12/1996 | Yoshioka et al. | |
| 5,670,935 A | 9/1997 | Schofield et al. | |
| 5,715,093 A | 2/1998 | Schierbeek et al. | |
| 5,796,094 A | 8/1998 | Schofield et al. | |
| 5,877,897 A | 3/1999 | Schofield et al. | |
| 5,949,331 A | 9/1999 | Schofield et al. | |
| 6,057,754 A | 5/2000 | Kinoshita et al. | |
| 6,067,110 A | 5/2000 | Nonaka et al. | |
| 6,085,151 A | 7/2000 | Farmer et al. | |
| 6,097,023 A | 8/2000 | Schofield et al. | |
| 6,118,401 A | 9/2000 | Tognazzini | |
| 6,118,410 A | 9/2000 | Nagy | |
| 6,201,642 B1 | 3/2001 | Bos | |
| 6,216,540 B1 | 4/2001 | Nelson et al. | |
| 6,313,454 B1 | 11/2001 | Bos et al. | |
| 6,353,392 B1 | 3/2002 | Schofield et al. | |
| 6,396,397 B1 | 5/2002 | Bos et al. | |
| 6,492,935 B1 | 12/2002 | Higuchi | |
| 6,498,620 B2 | 12/2002 | Schofield et al. | |
| 6,580,385 B1 | 6/2003 | Winner et al. | |
| 6,587,186 B2 | 7/2003 | Bamji et al. | |
| 6,674,895 B2 | 1/2004 | Rafii et al. | |
| 6,678,039 B2 | 1/2004 | Charbon | |
| 6,690,268 B2 | 2/2004 | Schofield et al. | |
| 6,690,354 B2 | 2/2004 | Sze | |
| 6,710,770 B2 | 3/2004 | Tomasi et al. | |
| 6,717,610 B1 | 4/2004 | Bos et al. | |
| 6,757,109 B2 | 6/2004 | Bos | |
| 6,771,208 B2 | 8/2004 | Lutter et al. | |
| 6,795,014 B2 | 9/2004 | Cheong | |
| 6,825,455 B1 | 11/2004 | Schwarte | |
| 6,831,591 B2 | 12/2004 | Horibe | |
| 6,876,775 B2 | 4/2005 | Torunoglu | |
| 6,903,677 B2 | 6/2005 | Takashima et al. | |
| 6,906,793 B2 | 6/2005 | Bamji et al. | |
| 6,919,549 B2 | 7/2005 | Bamji et al. | |
| 6,941,211 B1 | 9/2005 | Kuroda et al. | |
| 6,946,978 B2 | 9/2005 | Schofield | |
| 7,004,606 B2 | 2/2006 | Schofield | |
| 7,005,974 B2 | 2/2006 | McMahon et al. | |
| 7,012,560 B2 | 3/2006 | Braeuchle et al. | |
| 7,038,577 B2 | 5/2006 | Pawlicki et al. | |
| 7,042,389 B2 | 5/2006 | Shirai | |
| 7,053,357 B2 | 5/2006 | Schwarte | |
| 7,123,168 B2 | 10/2006 | Schofield | |
| 7,157,685 B2 | 1/2007 | Bamji et al. | |
| 7,176,438 B2 | 2/2007 | Bamji et al. | |
| 7,176,830 B2 | 2/2007 | Horibe | |
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,432,848 B2 | 10/2008 | Munakata | |
| 7,526,103 B2 | 4/2009 | Schofield et al. | |
| 7,613,568 B2 | 11/2009 | Kawasaki | |
| 7,706,978 B2 | 4/2010 | Schiffmann et al. | |
| 7,765,065 B2 | 7/2010 | Stiller | |
| 8,013,780 B2 | 9/2011 | Lynam | |
| 8,027,029 B2 | 9/2011 | Lu et al. | |
| 8,698,894 B2 | 4/2014 | Briggance | |
| 9,036,026 B2 | 5/2015 | Dellantoni et al. | |
| 9,146,898 B2 | 9/2015 | Ihlenburg et al. | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,753,121 B1 | 9/2017 | Davis et al. | |
| 2003/0138132 A1 | 7/2003 | Stam et al. | |
| 2003/0201929 A1 | 10/2003 | Lutter et al. | |
| 2005/0104089 A1 | 5/2005 | Engelmann et al. | |
| 2006/0091654 A1 | 5/2006 | De Mersseman et al. | |
| 2010/0001897 A1 | 1/2010 | Lyman | |
| 2010/0245066 A1 | 9/2010 | Sarioglu et al. | |
| 2011/0037640 A1 | 2/2011 | Schmidlin | |
| 2013/0215271 A1 | 8/2013 | Lu | |
| 2017/0003134 A1* | 1/2017 | Kim ................. G08G 1/09626 |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0045812 A1 | 2/2018 | Hess | |
| 2018/0059236 A1 | 3/2018 | Wodrich et al. | |
| 2018/0065623 A1 | 3/2018 | Wodrich et al. | |
| 2018/0067194 A1 | 3/2018 | Wodrich et al. | |
| 2018/0210074 A1* | 7/2018 | Hoare ................. G01S 7/527 |
| 2018/0217231 A1* | 8/2018 | Stanley ................ G01S 7/411 |
| 2018/0231635 A1 | 8/2018 | Woehlte | |
| 2018/0321142 A1* | 11/2018 | Seifert ................ B60W 50/14 |
| 2019/0072666 A1 | 3/2019 | Duque Biarge et al. | |
| 2019/0072667 A1 | 3/2019 | Duque Biarge et al. | |
| 2019/0072668 A1 | 3/2019 | Duque Biarge et al. | |
| 2019/0193735 A1* | 6/2019 | Cherniakov .... B60W 30/18027 |
| 2020/0017083 A1* | 1/2020 | Casselgren ............ B60T 8/172 |

OTHER PUBLICATIONS

Das et al., "Scan registration with multi-scale k-means normal distributions transform." Intelligent Robots and Systems (IROS), 2012 IEEE/RSJ International Conference on. IEEE, 2012.

Lundquist et al., "Estimation of the free space in front of a moving vehicle." 2009.

Schreier et al., "Robust free space detection in occupancy grid maps by methods of image analysis and dynamic B-spline contour tracking." Intelligent Transportation Systems (ITSC), 2012 15th International IEEE Conference on. IEEE, 2012.

* cited by examiner

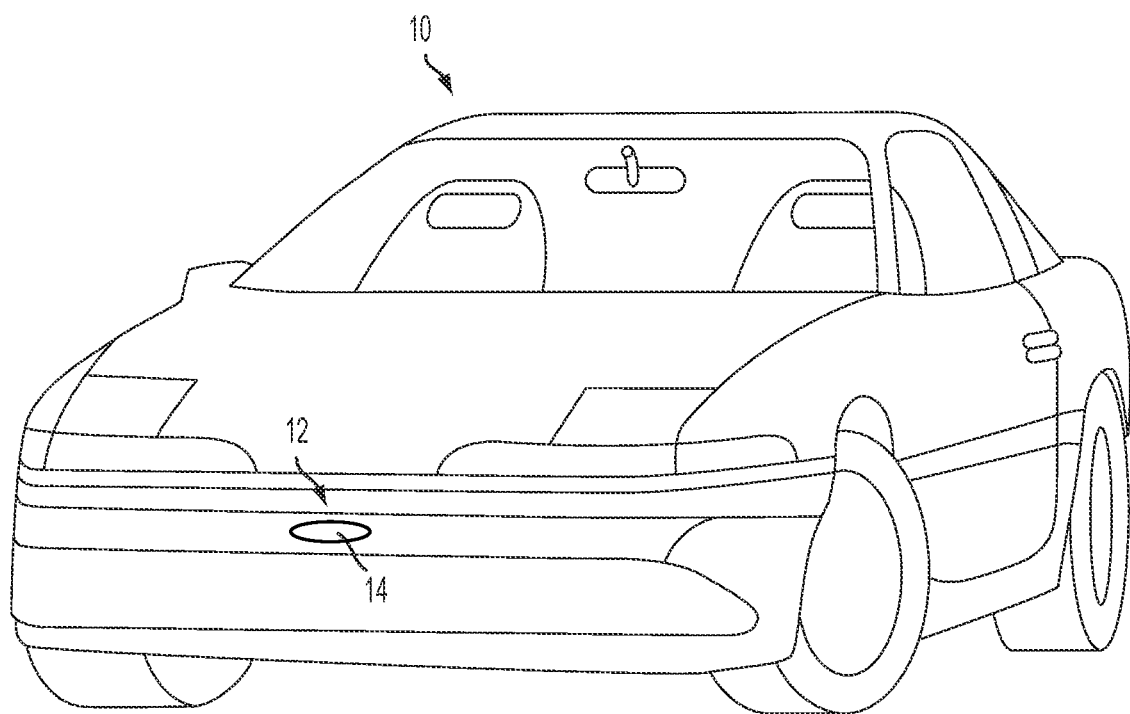

VEHICLE RADAR SENSING SYSTEM WITH SURFACE SEGMENTATION USING INTERFEROMETRIC STATISTICAL ANALYSIS

CROSS REFERENCE TO RELATED APPLICATION

The present application claims the filing benefits of U.S. provisional application Ser. No. 62/555,223, filed Sep. 7, 2017, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing at or around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes a sensor module or system disposed at the vehicle and comprising at least one radar sensor disposed at the vehicle and having a field of sensing exterior of the vehicle. The at least one radar sensor comprises multiple transmitting (Tx) antennas (transmitters) and receiving (Rx) antennas (receivers) to provide high definition, fine resolution in azimuth and/or elevation to determine high definition radar reflection responses for objects and surfaces detected by the system. The system includes a control, where outputs (such as radar data acquisitions of multiple scans) of the at least one radar sensor are communicated to the control, and where the control, responsive to the outputs of the at least one radar sensor, determines different types of surfaces at or near the equipped vehicle or on which the equipped vehicle is traveling. The system also detects the presence of one or more objects exterior the vehicle and within the field of sensing of at least one of the at least one radar sensor.

The control of the sensing system receives radar data sensed by at least one radar sensor (such as radar data of multiple consecutive scans) and receives a vehicle motion estimation. The control, responsive to received vehicle motion estimation and received sensed radar data (which is time stamped so that it can be correlated with the vehicle motion), determines the type of surface on and along which the vehicle is traveling.

The present invention provides a means to segment and distinguish different kind of surfaces seen by an automotive radar. Different surfaces present different scattering properties. Data acquired from consecutive scans can be used to coherently analyze the statistical properties of different range-angle cells corresponding to stationary objects. The cells sharing similar statistical properties can be clustered together. In this way, the range-angle imaging corresponding to stationary objects can be segmented. This technique is useful to distinguish the road and its path from the surroundings (such as a dirt shoulder along the side of the road) using automotive radar.

These and other objects, advantages, purposes and features of the present invention will become apparent upon review of the following specification in conjunction with the drawings.

BRIEF DESCRIPTION OF THE DRAWINGS

FIG. 1 is a perspective view of a vehicle with a sensing system that incorporates a radar sensor in accordance with the present invention.

DESCRIPTION OF THE PREFERRED EMBODIMENTS

A vehicle sensing system, such as a driver assist system, object detection system, parking assist system and/or alert system, operates to capture sensing data exterior of the vehicle and may process the captured data to detect objects or other vehicles at or near the equipped vehicle and in the predicted path of the equipped vehicle, such as to assist a driver of the equipped vehicle in maneuvering the vehicle in a forward or rearward direction or to assist the driver in parking the vehicle in a parking space. The system includes a processor that is operable to receive sensing data from one or more sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle).

Referring now to the drawings and the illustrative embodiments depicted therein, a vehicle 10 includes an driver assistance system or sensing system 12 that includes at least one radar sensor unit, such as a forward facing radar sensor unit 14 (and the system may optionally include multiple exterior facing sensors, such as multiple exterior facing radar sensors or cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

Some automotive radars use MIMO (Multiple Input Multiple Output) techniques to create an effective virtual antenna aperture, which is significantly larger than the real antenna aperture, and delivers much better angular resolution than conventional radars, such as, for example, conventional scanning radars.

Algorithms for automotive radar that estimate road surfaces and free space are typically based on target detection lists. The algorithms create clusters by grouping targets that are close to each other and taking into account their accuracies. This presents several limitations, such as sparsity to identify surfaces or the fact that there is no proper scattering mechanism analysis present in the algorithms. The system of the present invention deals with images related to non-moving objects. The images are naturally oriented to better identify surfaces. In addition, the system of the present invention is oriented to work with amplitudes and phases. Therefore, the system presents a more refined and robust statistical analysis than using only points as typical algorithms use.

The system of the present invention segments different kind of surfaces seen by an automotive radar by using the scattering properties of differing surfaces. The system receives as input an ego motion estimation (that estimates the motion of a sensor disposed at the subject or equipped vehicle), a complex (phase and amplitude) acquisition or image for at least two consecutive scans of the radar system, a time stamp for each acquisition, and a sensor position of the sensor with respect to the vehicle. Each of the images is dedicated to non-moving objects, and can be either two dimensional (2D) or three dimensional (3D). The dimensions in the case of a 2D acquisition include Range and Angle, while the dimensions in the case of having a volume (3D) include Range, Azimuth Angle and Elevation Angle. Optionally, the image may be provided in Cartesian coordinates.

During operation, the images from different scans are coregistered. To coregister the images, one image is taken as a reference and the rest of the images are transformed such that every pixel/voxel of the image refers to the same physical space as the pixels/voxels of the reference image. This coregistration may vary along the image. The displacement of the car (determined based on ego-motion and time stamp) is taken into account. A fine coregistration may be performed based on point-like targets or distributed targets or a mix of both, depending on the scene nature.

The set of images can be paired generating interferograms. In other words, pairing images by multiplying one coregistered image by the conjugate of another image. The scans can be paired in different ways, such as, for example, pairing consecutive scans in order to minimize the decorrelation and the amount of data.

The next step is to "flatten" the interferometric phase by taking into account a first model of a terrain model. When there is a terrain model available, it is possible to generate its synthetic phase and subtract it from the previously obtained interferometric phase. In cases where there is not a terrain model, it is possible to generate the corresponding interferograms for a flat surface, taking into account the sensor position on the scans.

The system of the present invention can carry on a statistical analysis that takes into account amplitudes and phases for the different rg-angle(s) interferometric cells. The cells showing similar statistical properties will be clustered together. Different kinds of interferometric analysis can be performed, such as Region Growing, Amplitude-Phase driven filters, Non-Local filters, and/or the like. In this way, the system determines a surface segmentation based on a surface scattering mechanism. The system can thus determine and distinguish a road surface from a non-road surface, such as a dirt shoulder by the road, so that the system can assist in determining or maintaining a path of travel of the vehicle along the road.

Thus, the sensing system of the present invention segments different kinds of surfaces sensed or seen by an automotive radar. The system is based on the fact that different surfaces present different scattering properties. Data acquired from consecutive scans can be used by the sensing system to coherently analyze the statistical properties of different range-angle cells corresponding to stationary objects. The cells sharing similar statistical properties may be clustered together. In this way, the range-angle imaging corresponding to stationary objects may be segmented. This technique is useful for distinguishing the road and its path from the surroundings using automotive radar.

The system may provide an output for a driving assist system of the vehicle, such as one or more of (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain management, (x) collision mitigation and (xi) intersection collision mitigation. Optionally, the output may be provided to an autonomous vehicle control system.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system. The forward viewing camera and/or the sensor of the lane determining system may comprise one of the cameras and/or one of the sensors of the autonomous vehicle control system.

The sensing system may include a machine vision system (comprising at least one exterior viewing camera disposed at the vehicle and an image processor for processing image data captured by the at least one camera), where information is shared between the stereo radar and the machine vision system.

The system may include two or more individual radars, having individual or multiple Tx (transmitters) and Rx (receivers) on an antenna array, and may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A sensing system for a vehicle, said sensing system comprising:
    at least one radar sensor disposed at a vehicle equipped with said sensing system and having a field of sensing exterior of the equipped vehicle;
    wherein said at least one radar sensor comprises multiple transmitting antennas and multiple receiving antennas, wherein said transmitting antennas transmit signals and said receiving antennas receive the signals reflected off objects;
    a control comprising a processor, wherein radar data sensed by said at least one radar sensor is received at said control and processed at said processor;
    wherein the received sensed radar data comprises radar data images for a plurality of scans by said at least one radar sensor, and wherein each scan of the plurality of scans is associated with a respective timestamp representative of a point in time when the scan was captured;
    wherein a vehicle motion estimation is received at said control, and wherein the vehicle motion estimation is representative of a time-stamped motion of the vehicle;
    wherein said control, based on the vehicle motion estimation and the respective timestamps of the plurality of scans, determines a displacement of the vehicle between each of the plurality of scans; and
    wherein said control, responsive at least in part to processing at the processor of the plurality of scans and the determined displacement of the vehicle between each of the plurality of scans, determines different types of surfaces in the field of sensing of said at least one radar sensor.

2. The sensing system of claim 1, wherein said at least one radar sensor is disposed at a front portion of the equipped vehicle and senses forward of the equipped vehicle.

3. The sensing system of claim 2, wherein said control, responsive at least in part to processing at the processor of the received sensed radar data, distinguishes a surface of a road along which the equipped vehicle is traveling from a non-road surface adjacent to the road.

4. The sensing system of claim 1, wherein the received sensed radar data comprises radar data images for at least two consecutive scans by said at least one radar sensor.

5. The sensing system of claim 4, wherein radar data acquisitions obtained from the at least two consecutive scans comprise two dimensional radar data images.

6. The sensing system of claim 4, wherein radar data acquisitions obtained from the at least two consecutive scans comprise three dimensional radar data images.

7. The sensing system of claim 4, wherein each radar data image of each of the plurality of scans is time stamped.

8. The sensing system of claim 7, wherein said control coregisters images from different scans of the plurality of scans.

9. The sensing system of claim 8, wherein the coregistered images from different scans of the plurality of scans can be paired to generate interferograms by multiplying a coregistered image by the conjugate of another image.

10. The sensing system of claim 1, wherein said control, responsive at least in part to processing at the processor of the received sensed radar data and the determined displacement of the vehicle between each of the plurality of scans, analyzes statistical properties of range-angle cells corresponding to stationary objects.

11. The sensing system of claim 10, wherein said control clusters range-angle cells with similar statistical properties together.

12. The sensing system of claim 11, wherein said control segments the different types of surfaces.

13. The sensing system of claim 1, wherein said control, responsive to processing at the processor of the received sensed radar data, detects the presence of one or more objects exterior the equipped vehicle and within the field of sensing of said at least one radar sensor.

14. The sensing system of claim 1, wherein a vision system of the equipped vehicle comprises at least one exterior viewing camera disposed at the equipped vehicle and an image processor for processing image data captured by the at least one camera, and wherein information is shared between said sensing system and the vision system of the equipped vehicle.

15. The sensing system of claim 1, wherein said sensing system comprises two or more individual radar sensors, each having multiple transmitting antennas and receiving antennas on an antenna array, and wherein information is shared between the individual radars operating in stereo to determine high definition radar reflection responses for object detection by said sensing system.

16. The sensing system of claim 1, wherein said sensing system provides an output for at least one driving assist system function selected from the group consisting of (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain management, (x) collision mitigation and (xi) intersection collision mitigation.

17. A sensing system for a vehicle, said sensing system comprising:
    at least one radar sensor disposed at a vehicle equipped with said sensing system and having a field of sensing exterior of the equipped vehicle;
    wherein said at least one radar sensor comprises multiple transmitting antennas and multiple receiving antennas, wherein said transmitting antennas transmit signals and said receiving antennas receive the signals reflected off objects;
    a control comprising a processor, wherein radar data sensed by said at least one radar sensor is received at said control and processed at said processor;
    wherein the received sensed radar data comprises radar data images for a plurality of scans by said at least one radar sensor, and wherein each scan of the plurality of scans is associated with a respective timestamp representative of a point in time when the scan was captured;
    wherein the received sensed radar data comprises radar data images for at least two consecutive scans by said at least one radar sensor;
    wherein a vehicle motion estimation is received at said control, and wherein the vehicle motion estimation is representative of a time-stamped motion of the vehicle;
    wherein said control, based on the vehicle motion estimation and the respective timestamps of the plurality of scans, determines a displacement of the vehicle between each of the plurality of scans;
    wherein said control, responsive at least in part to processing at the processor of the plurality of scans and the determined displacement of the vehicle between each of the plurality of scans, determines different types of surfaces in the field of sensing of said at least one radar sensor;

wherein said control, responsive at least in part to processing at the processor of the received sensed radar data, distinguishes a surface of a road along which the equipped vehicle is traveling from a non-road surface adjacent to the road; and wherein said sensing system provides an output for at least one driving assist system function selected from the group consisting of (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain management, (x) collision mitigation and (xi) intersection collision mitigation.

18. The sensing system of claim 17, wherein said control coregisters images from different scans of the plurality of scans, and wherein the coregistered images from different scans can be paired to generate interferograms by multiplying a coregistered image by the conjugate of another image.

19. The sensing system of claim 17, wherein said control segments the different types of surfaces.

20. A sensing system for a vehicle, said sensing system comprising:

at least one radar sensor disposed at a vehicle equipped with said sensing system and having a field of sensing exterior of the equipped vehicle;

wherein said at least one radar sensor is disposed at a front portion of the equipped vehicle and senses forward of the equipped vehicle;

wherein said at least one radar sensor comprises multiple transmitting antennas and multiple receiving antennas, wherein said transmitting antennas transmit signals and said receiving antennas receive the signals reflected off objects;

a control comprising a processor, wherein radar data sensed by said at least one radar sensor is received at said control and processed at said processor;

wherein the received sensed radar data comprises radar data images for a plurality of scans by said at least one radar sensor, and wherein each scan of the plurality of scans is associated with a respective timestamp representative of a point in time when the scan was captured;

wherein a vehicle motion estimation is received at said control, and wherein the vehicle motion estimation is representative of a time-stamped motion of the vehicle;

wherein said control, based on the vehicle motion estimation and the respective timestamps of the plurality of scans, determines a displacement of the vehicle between each of the plurality of scans;

wherein said control, responsive at least in part to processing at the processor of the plurality of scans and the determined displacement of the vehicle between each of the plurality of scans, determines different types of surfaces in the field of sensing of said at least one radar sensor;

wherein said control coregisters images from different scans of the plurality of scans, and wherein the coregistered images from different scans can be paired to generate interferograms by multiplying a coregistered image by the conjugate of another image;

wherein said control, responsive to processing at the processor of the received sensed radar data, detects the presence of one or more objects exterior the equipped vehicle and within the field of sensing of said at least one radar sensor; and wherein said sensing system provides an output for at least one driving assist system function selected from the group consisting of (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain management, (x) collision mitigation and (xi) intersection collision mitigation.

21. The sensing system of claim 20, wherein said control, responsive at least in part to processing at the processor of the received sensed radar data, distinguishes a surface of a road along which the equipped vehicle is traveling from a non-road surface adjacent to the road.

22. The sensing system of claim 20, wherein said control, responsive at least in part to processing at the processor of the received sensed radar data and the determined displacement of the vehicle between each of the plurality of scans, analyzes statistical properties of range-angle cells corresponding to stationary objects, and wherein said control clusters range-angle cells with similar statistical properties together, and wherein said control segments the different types of surfaces.

* * * * *